United States Patent Office 2,734,052
Patented Feb. 7, 1956

2,734,052

METAL COMPLEX FORMING AZO DYESTUFFS

Gerhard Dittmar, Leverkusen, Rolf Pütter, Dusseldorf, and Fritz Suckfüll, Leverkusen, Germany, assignors to Farbenfabriken Bayer Aktiengesellschaft, Leverkusen, Germany, a corporation of Germany No Drawing. Application November 25, 1953, Serial No. 394,498

Claims priority, application Germany December 3, 1952

7 Claims. (Cl. 260—146)

The present invention relates to new metal complex forming azo dyestuffs, to metal complex compounds of these dyestuffs and to processes of making the same; more particularly it relates to metal complex forming azo dyestuffs of the general formula

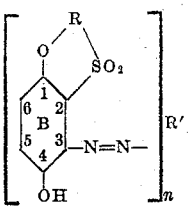

In this formula R stands for an organic radical of the aliphatic or aromatic series, R' means an aromatic radical which may contain azo groups and which bears in ortho-position to the —N=N— bridge a complex forming group, n is the integer 1 or 2, and B stands for a benzene or naphthalene nucleus. It further relates to the metal complex compounds of the azo dyestuffs of the above formula and to processes of making these dyestuffs and their metal complex compounds.

Our new dyestuffs may be obtained by coupling diazo- or tetrazo compounds bearing in ortho-position to the diazo groups a group capable of forming complex compounds with coupling components being derivatives of a 1,4-dihydroxybenzene or 1,4-dihydroxynaphthalene one hydroxy group of which is connected with a —SO₂— group in adjacent position by means of an aliphatic or aromatic linking member to form cyclic ether-sulfones. The diazo or tetrazo compounds to be used may contain already azo groups, i. e., they may be obtained from aminoazo compounds or from diaminoazo compounds. Polyazo dyestuffs according to the present invention may also be obtained, if amino groups present in the complex forming azo dyestuffs or groups which can be converted into amino groups and are so converted, are diazotized and coupled with suitable coupling components.

Dyestuffs of the present type may further be obtained by diazotizing derivatives of 1,4-dihydroxybenzene or 1,4-dihydroxynaphthalene one hydroxy group of which is connected with a —SO₂— group in adjacent position by means of an aliphatic or aromatic linking member to cyclic ether-sulfones and which bear a diazotizable amino group in the position between the other hydroxy group and the —SO₂—group and coupling these diazo compounds with coupling components capable of coupling into ortho-position to a group capable of forming metal complex compounds. According to the number of the positions capable of coupling, coupling may take place once or several times; also in this process the coupling components used may contain already azo groups. Further also here the metal complex forming azo dyestuffs in so far as they contain diazotizable amino groups or groups which can be converted into those groups can be diazotized and coupled with coupling components. Included in these two above-mentioned processes of making the new dyestuffs is the particular case wherein the diazo component as well as the coupling component are cyclic ether-sulfones of the described kind.

The diazo components and the coupling components employed in the preparation of the new dyestuffs may contain water-solubilizing groups or may be free from them.

The new metal complex forming azo dyestuffs may be converted into their metal complex compounds by the conventional methods and processes; metal complex formation is possible in substance, on the fibre by after-treatment or in the dyeing-bath. According to their constitution the new dyestuffs and their metal complex compounds are suited for dyeing of fibres of natural or regenerated cellulose, fibres of animal origin and polyamide fibres.

The dyeings with the metal containing dyestuffs obtained by the one or the other of the indicated usual methods are distinguished by clear shades and good fastness properties.

The cyclic ether-sulfones employed in the manufacture of the new dyestuffs can be obtained by reacting quinones which are capable of addition in ortho-position to one >C=O-group with organic sulfinic acids which contain in the organic part a radical capable of reacting as an anion, and by leaving the thus formed dihydroxy arylsulfones in weakly acid almost neutral to alkaline medium, if necessary, at elevated temperature, until ring-formation under condensation has taken place. Quinones suited for the reaction are 1,4-benzoquinone and 1,4-naphthoquinone as well as their substitution products having at least one free o-position with respect to the >C=O groups. Organic sulfinic acids which are suitable for the present reaction are e. g. chloro-methane sulfinic acid, bromo-methane sulfinic acid, 2-chloro-ethane sulfinic acid, 2-acetoxy-ethane sulfinic acid, o-halogeno benzene sulfinic acids.

In the case of 1,4-benzoquinone, for instance, the reaction takes the following route

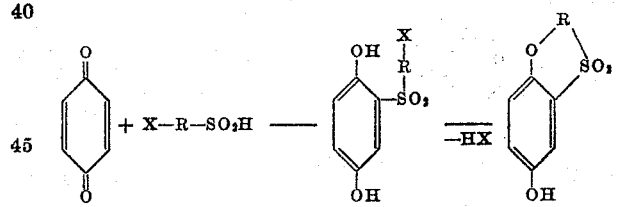

X is the radical capable of reacting as anion, R has the same meaning as above. The preferred radical X is halogen, in particular chlorine.

The first step of the reaction—the addition of the organic sulfinic acid to the quinone—is carried out in aqueous acid medium containing, if necessary, some additional acid e. g. hydrochloric acid, for, as it is known, the addition reaction only takes place if the free sulfinic acid is present, however, in many cases one uses as starting material the sodium salt of the sulfinic acids and has to add sufficient acid e. g. hydrochloric acid to set free the sulfinic acid. The temperature best suited for this addition reaction varies from case to case, but can easily be found out; in general suitable temperatures will be found between about 0° C. and about 70° C.

The second step of the reaction, the ring-formation, takes place—as stated above—in weakly acid almost neutral to alkaline medium. In general the best results are achieved at weakly alkaline reaction; in some cases, however, a more strongly alkaline reaction is preferred. But there are also cases where better yields are obtained in neutral to weakly acid medium. The most suitable reaction conditions in the individual case may be easily found out by trial. The ring-formation in general takes place very easily and smoothly, sometimes already at room temperature. In general it is expedient to use elevated temperatures up to about 100° C. in order to reduce the reaction time; in cases where the radical X is not easily exchangeable such as it is the case with chlorine in aromatic linkage, it is expedient to effect the ring-formation at higher temperature in an autoclave.

The new compounds contain, as seen from the above process description, a free hydroxy group linked to an aromatic nucleus. By way of variation in the quinone compound and in the organic sulfinic acid compound it is possible to prepare cyclic ether-sulfones containing the most different substituents; moreover, substituents present may be changed or exchanged by known methods. Substituents may also be introduced after the ring-formation. According to the described process and its variations the new cyclic ether-sulfones are obtained in good, partly in very good yield. The new compounds are valuable intermediates for the manufacture of dyestuffs, textile assistant's, pest controlling agents, and plastics. The compounds thus obtained correspond to the general formula

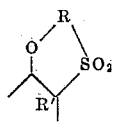

wherein R means an organic radical and R' an aromatic radical containing a hydroxy group. By nitrating compounds of this type nitro compounds may be obtained which can be reduced to the corresponding amino compounds. It is obvious the amino group may be introduced in these compounds also by other methods e. g. by coupling the cyclic ether-sulfones with simple diazo compounds and reducing the azo dyestuffs obtained to the amino compound. Also sulfonic acid groups may be introduced into these compounds. The cyclic ether-sulfones used as starting materials in making the new dyestuffs and a process of preparing the same are described in details in copending U. S. application Serial No. 366,616 and include compounds such as those of the formula

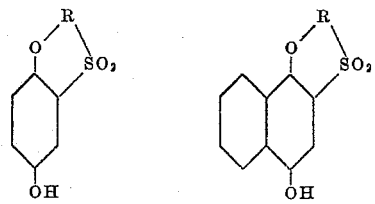

The following examples illustrate the preparation of the dyestuff intermediates; the parts being by weight.

*Example 1*

A solution of 57.3 parts of chloro-methane sulfinic acid in 500 parts of water is mixed with 5 parts of hydrochloric acid (D=1.15) and heated to 50° C. Into this solution 50 parts of benzoquinone are sprinkled within 20 minutes. The major quantity of the quinone quickly dissolves. The reaction is completed by heating the mixture to 70° C. for 30 minutes. After removing a slight tarry residue by filtering the solution is rendered alkaline and heated to 70° C.; the alkaline reaction disappears soon and it is only after gradually adding further 30 parts of sodium hydroxide solution (D=1.35) that no more alkali metal hydroxide solution is consumed. 25 parts of hydrochloric acid are added to the clear solution, thereafter the solution is cooled. The reaction product separates soon in coarse crystals and is further purified by recrystallization from water. After drying it melts at 145° C. The analytical values (calculated: C 45.2%, H 3.3%, S 17.25%—found: C 44.95%, H 3.6%, S 17.5%) correspond to the empirical formula $C_7H_6O_4S$, i. e. a compound of the following structural formula:

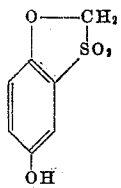

The same product is obtained when replacing in the above reaction chloro-methane sulfinic acid by bromo-methane sulfinic acid.

A mononitro compound of the M. P. 259° C. is obtained by nitrating the new compound. The nitro compound yields on reduction the corresponding amino compound of the melting point 186° C. The nitro group and the amino group respectively occupy the position between the OH-group and the —$SO_2$— group.

*Example 2*

The aqueous solution of 64.3 parts of 2-chloro-ethane sulfinic acid is reacted with 45 parts of benzoquinone in an aqueous acid medium in a manner similar to that described in Example 1. A slight quantity of a tarry residue is formed, which is removed. At 70° C. the solution is rendered weakly acid by adding sodium hydroxide solution. The gradual addition of further 40 parts of sodium hydroxide solution is required to maintain the weakly acid reaction. After 60 minutes 10 parts of hydrochloric acid are added and the solution is cooled. The well crystallized product thus obtained melts at 174° C. after recrystallizing and drying. The analytical values (calculated: C 48.0%, H 4.0%, S 16.0%—found: C 47.9%, H 4.3%, S 16.25%) correspond to the empirical formula $C_8H_8O_4S$, i. e. a compound of the following structural formula

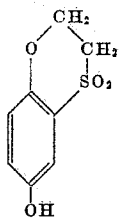

*Example 3*

105.5 parts of 2,5-dichloro benzene sulfinic acid and 45 parts of benzoquinone are mixed with stirring in 1000 parts of water and heated to 70° C. The benzoquinone has dissolved after 30 minutes and a thick crystal paste has formed. (A sample taken from the paste shows the M. P. 192° C. after drying.) The crystal paste is dissolved in 48 parts of sodium hydroxide solution (alkaline reaction), and heated in the autoclave to 135° C. for 5 hours. After cooling the solution is filtered and the resultant, crystalline product further purified by recrystallizing from methanol. M. P.=250° C. The analytical values (calculated C 51%, H 2.5%, S 11.3%, Cl 12.5%—found: C 51%, H 2.8%, S 11.6%, Cl 12.8%) correspond to the empirical formula $C_{12}H_7O_4SCl$, i. e. a compound of the following structural formula

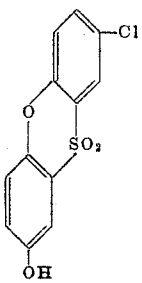

Example 4

A solution of 57.3 parts of chloro-methane sulfinic acid in 2000 parts of water is mixed with 20 parts of hydrochloric acid and cooled to 0° C. 75 parts of 1,4-naphthoquinone are gradually sprinkled into the solution. The naphthoquinone has dissolved after stirring at 0° C. for 10 hours. A thick paste of small crystals has formed. The crystal paste is adjusted to pH 9–10 with sodium carbonate solution at 0° C. the air being replaced by nitrogen and the mixture stirred for 4 hours. The mixture is then heated to 80° C., adjusted to pH 11.5 by addition of sodium hydroxide solution and the dark solution is clarified after addition of animal charcoal. On neutralizing to a weakly alkaline reaction by means of hydrochloric acid the reaction product precipitates in fine crystals. After recrystallizing from methanol the product melts at 268° C. The analytical values (calculated: C 56.0%, H 3.4%, S 13.5%—found: C 56.0%, H 3.7%, S 13.0%) correspond to the empirical formula $C_{11}H_8O_4S$, i. e. a compound of the following structural formula

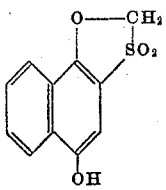

Example 5

110 parts of 2-chloro-5-nitrobenzene sulfinic acid and 45 parts of benzoquinone are stirred in 450 parts of hydrochloric acid of 1 percent at 10° C. The reaction is complete after 2 hours. The crystal paste is isolated (a sample melts at 125° C. after drying) and stirred with 500 parts of water. This mixture is rendered alkaline by addition of 70 parts of sodium carbonate and heated to 80° C. within 30 minutes. After cooling the resultant precipitate is separated, dried and recrystallized from glacial acetic acid. The product obtained melts at 298° C. The analytical values (calculated: C 49.2%, H 2.4%, N 4.8%, S 10.9%—found: C 48.9%, H 2.5%, N 4.6%, S 10.5%) correspond to the empirical formula $C_{12}H_7O_6NS$ i. e. a compound of the following structural formula

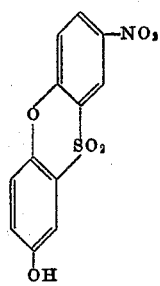

By reducing the nitro group of this compound the corresponding amino substitution product of the M. P. 249° C. is obtained.

Example 6

8.7 parts of sodium 2-acetoxy-ethane sulfinate are dissolved in 50 parts of cold water and mixed with 8 parts of hydrochloric acid of 22° Bé. The solution is combined with a finely distributed suspension of 5 parts of benzoquinone in 50 parts of water at 5° C. After about 10 minutes the benzoquinone has dissolved with separation of a tarry impurity, which is removed. After addition of 16 parts of sodium hydroxide solution (D=1.35) the solution is heated and kept at the boil for 10 minutes and then rendered acid to Congo red paper with 9 parts of hydrochloric acid of 22° Bé. The reaction product crystallizes upon cooling the solution and melts at 174° C. The identity of this substance and the compound obtained according to Example 2 can be ascertained by fusing them together: M. P. 174° C.

Example 7

17.5 parts of 4.4'-dichloro-diphenyl-3.3'-disulfinic acid (obtained by reducing 4.4'-dichlorodiphenyl-3.3'-disulfochloride with aqueous $Na_2SO_3$ solution at 90° C.) are well stirred with 200 parts of water and 5 parts of hydrochloric acid of 22° C. After introducing 10.8 parts of benzoquinone the mixture is stirred first at room temperature for 30 minutes, then at 80° C. for 60 minutes, and finally filtered with suction when cold. The paste is dissolved in 200 parts of water with the addition of 8 parts of sodium hydroxide and the solution is heated after addition of 10 parts of sodium carbonate in an autoclave to 135° C. for 5 hours. The reaction product precipitates upon cooling in white crystals which are filtered with suction. The crystals are suspended in 100 parts of water and the suspension is rendered weakly acid by adding hydrochloric acid. The precipitate is filtered with suction and washed salt-free with water. After drying the product is obtained as a white powder which can be recrystallized from boiling pyridine (150 parts upon 1 part of substance) with the addition of hot water (35 parts).

The substance is free from chlorine and melts at 448° C. with decomposition. The analytical values (calculated: C 58.4%, H 2.8%, S 12.9%—found; C 58.8%, H 3.0%, S 12.5%) correspond to the empirical formula $C_{24}H_{14}O_8S_2$, i. e. a compound of the following structural formula

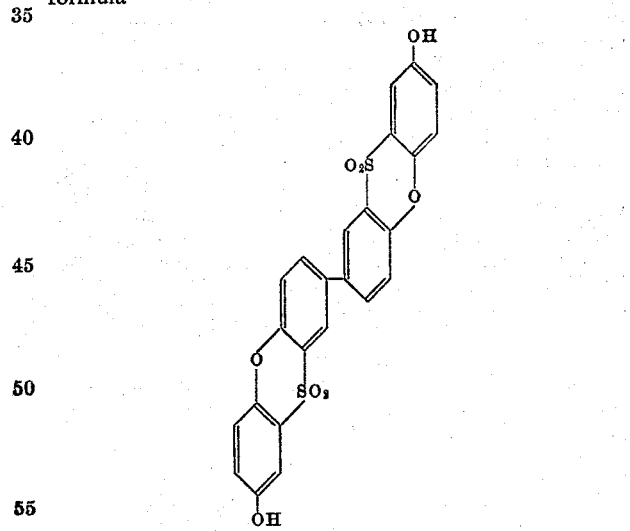

The following examples illustrate the invention without, however, limiting it thereto, the parts being by weight.

Example 8

20.1 parts of aminohydroquinone methylene sulfone ether (4-amino-5-hydroxybenzoxathiol-S-dioxide obtainable by reduction of the 4-nitro compound) are dissolved in 150 parts of water with 12 parts of caustic soda solution (d.=1.355). After adding 6.9 parts of sodium nitrite the solution is dropped into 250 parts of a 10 percent sulfuric acid. The temperature is kept at 5° C. by adding ice. The diazo solution is added to a solution of 17.4 parts of 1-phenyl-3-methyl-5-pyrazolone in 200 parts of water, 12 parts of caustic soda-solution and 30 parts of sodium carbonate. Coupling takes place very quickly. After the addition of sodium chloride the coupling product is precipitated from the solution and filtered off. The dyestuff obtained, corresponding to the following formula:

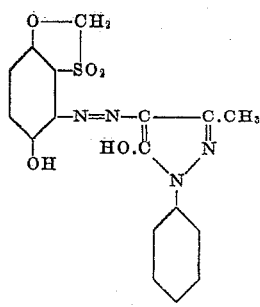

is dissolved with heating in 500 parts of water under adding 12 parts of caustic soda solution. A solution of 100 parts of water, 22 parts of a basic chromium sulfate lye (18.3 percent $Cr_2O_3$), 14 parts of oxalic acid, and 15 parts of caustic soda solution is dropped in at boiling temperature. Thereafter the solution is heated to the boil for further 5 hours. The dyestuff chromium complex thus formed is filtered off after adding a little sodium chloride. When dried it represents a red-brown powder which dissolves in water with a bluish red color; it dyes wool from a weakly acid bath clear bordeaux shades. The dyeings are distinguished by good fastness properties.

Dyestuffs of similar properties are obtained if instead of 1-phenyl-3-methyl-5-pyrazolone 1-(2'-chlorophenyl)-3-methyl-5-pyrazolone, 1-(3'-chlorophenyl)-3-methyl-5-pyrazolone, 1-(2',5'-dichlorophenyl)-3-methyl-5-pyrazolone or 1-(3'-nitrophenyl)-3-methyl-5-pyrazolone are employed. The dyestuffs prepared from the last-mentioned pyrazolone yields distinctly bluer dyeings than the other dyestuffs.

The corresponding cobalt complex compounds dye animal fibres or polyamide fibres from neutral to weakly acid bath fast red shades. They can be obtained from the described metal-free dyestuffs in the following manner:

The dyestuff is dissolved under heating in 500 parts of water with the addition of 12 parts of caustic soda; within one hour the solution of a cobalt-ammonia-complex is added thereto. When metal-free dyestuff can no longer be detected the cobalt-dyestuff-complex is isolated and dried. The cobalt-ammonia-complex is obtained as follows:

15 parts of cobalt sulfate are dissolved in 300 parts of water; after addition of 70 parts of a 30% ammonia solution the cobalt is oxidized to the trivalent form by passing air through the solution.

*Example 9*

20.1 parts of aminohydroquinone methylene sulfone ether are diazotized as described in Example 1 and then added to a solution of 150 parts of water, 15 parts of tert.-butylphenol and 36 parts of caustic soda solution (d.=1.355). After stirring for 5 hours at 10° C. the coupling product is precipitated by adding sodium chloride and filtered off. It corresponds to the following formula:

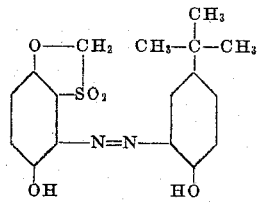

37.2 parts of this dyestuff are converted into the dyestuff chromium complex by means of the sodium salt of chromium oxalic acid as described in Example 1, and after the chroming is completed the dyestuff chromium complex is precipitated by adding sodium chloride and filtered off. When dried it represents a blue-black powder which dissolves in water with a red-blue color. Wool is dyed therewith from a neutral to weakly acid bath reddish blue shades. The dyeings are distinguished by good fastness properties.

If instead of the tert.-butylphenol 18.4 parts of 3-hydroxydiphenylene oxide are employed and the process is further carried out as described above, a dyestuff is obtained which dyes wool from a neutral to weakly acid bath grey to black shades.

*Example 10*

A diazo compound prepared from 20.1 parts of aminohydroquinone methylene sulfone ether according to Example 1 is added to a solution of 14.4 parts of 2-hydroxynaphthalene, 12.5 parts of caustic soda solution, 30 parts of sodium carbonate in 200 parts of water. The coupling is completed very quickly. After adding a little sodium chloride the azo dyestuff formed is filtered off. It corresponds to the following formula:

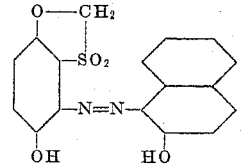

38.8 parts of the dyestuff thus prepared are heated in 1 liter of water to which caustic soda solution is added. A solution of the sodium salt of chromium salicylic acid corresponding to a quantity of 2.7 parts of chromium and 14 parts of salicylic acid is added thereto. After heating for 3 hours to 100° C. the dyestuff is completely converted into its chromium complex. This chromium complex is precipitated by adding a little sodium chloride and filtered off. After drying it represents a blue-black, water-soluble powder which dyes wool reddish blue shades of good fastness properties.

*Example 11*

20.1 parts of aminohydroquinone methylene sulfone ether are converted to the diazo compound as described in Example 1, which is then added to a solution of 24.6 parts of 1-hydroxynaphthalene-5-sulfonic acid, 30 parts of sodium carbonate and 200 parts of water. The coupling takes place very quickly. After one hour the coupling product is separated by adding sodium chloride and hydrochloric acid until the reaction is weakly alkaline, and filtered off. When dried the dyestuff represents a red-brown powder which dissolves in alkaline water with a blue color; the solution turns red on adding acetic acid. The dyestuff dyes wool from an acid bath red shades. By an after-treatment with chromium yielding agents in customary manner, a blue dyeing of good fastness properties is obtained. The dyestuff corresponds to the following formula:

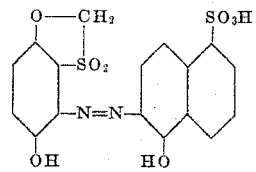

If in this example the 1-hydroxynaphthalene-5-sulfonic acid is replaced by equal quantities of 1-hydroxynaphthalene-4-sulfonic acid or 2-hydroxynaphthalene-6-sulfonic acid, dyestuffs of similar properties are obtained. When using 34.8 parts of 1-hydroxynaphthalene-4,8-disulfonic acid as coupling component, a dyestuff is obtained which dyes wool also red shades. By an after-treatment with chromium yielding agents the shade turns to a clear greenish blue.

*Example 12*

15.75 parts of 1-amino-2-methoxy-5-chlorobenzene are dissolved in 600 parts of water and 25 parts of hydrochloric acid (d.=1.15). A solution of 6.9 parts of sodium nitrite in 20 parts of water is dropped in at a temperature of 5° C. The diazo compound thus obtained is added to a solution of 18.6 parts of hydroquinone methylene sulfone ether (5-hydroxybenzoxathiol-S-dioxide), 12 parts of caustic soda solution (d.=1.355) and 30 parts of sodium carbonate. The azo dyestuff is filtered off and dried. It corresponds to the following formula:

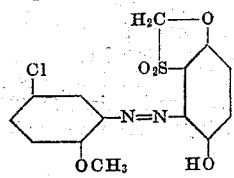

34.3 parts of the dyestuff thus prepared are heated with 500 parts of ethylene glycol and a solution of 20 parts of a 25 percent chromic oxide in 80 parts of formic acid to a temperature of 140° C. By adding caustic soda solution the reaction is gradually rendered weakly alkaline. When the dyestuff is completely converted into its chromium complex, the solution is poured into 2000 parts of water. The dyestuff chromium complex is then separated by adding sodium chloride and filtered. When dried it represents a dark blue powder which dissolves in water with a reddish blue color; it dyes wool and polyamide fibres from a neutral to weakly acid bath reddish blue shades of good fastness properties.

If in this example instead of hydroquinone methylene sulfone ether 28.2 parts of hydroquinone-4'-chlorophenylene sulfone ether (3-hydroxy-6-chlorophenoxthin-S-dioxide) of the following formula:

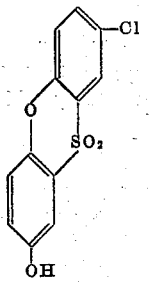

are employed, a dyestuff is obtained which dyes wool somewhat redder shades of equally good fastness properties.

Example 13

14.4 parts of 1-amino-2-hydroxy-5-chlorobenzene are thoroughly stirred with 200 parts of water and 25 parts of hydrochloric acid (d.=1.15) and diazotized by adding an aqueous solution of 6.9 parts of sodium nitrite at 5° C. The diazo compound thus obtained is added to a solution of 23.6 parts of 1,4-naphthydroquinone methylene sulfone ether (4'-hydroxynaphto-(2',1':4,5)-oxathiol-S-dioxide), 12 parts of caustic soda solution (d.=1.355), 30 parts of sodium carbonate and 200 parts of water. After stirring for one hour, further 20 parts of caustic soda solution are added, and the solution is stirred for another 2 hours and finally heated to 40° C. After adding a little sodium chloride the azo dyestuff which corresponds to the following formula:

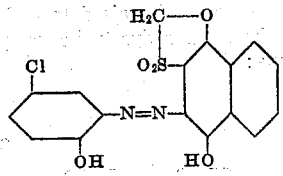

is filtered off. 38 parts of the dyestuff thus obtained are dissolved in 1500 parts of water under adding caustic soda solution and converted into the chromium complex by means of the sodium salt of chromium salicylic acid as similarly described in Example 3. The dyestuff represents a dark blue powder which dissolves in water with a blue color; it dyes wool or polyamide fibres blue shades of good fastness properties.

If instead of 1-amino-2-hydroxy-5-chlorobenzene 1-amino-2-hydroxy-4-nitrobenzene is employed and the coupling product is converted into its chromium complex in the same manner, a blue powder is obtained which dyes wool from a neutral to weakly acid bath greenish blue shades of good fastness properties.

Example 14

17.3 parts of 1-aminobenzene-4-sulfonic acid are diazotized in customary manner and added to a solution prepared from 15.1 parts of 2-acetylamino-1-hydroxybenzene, 10 parts of a 30 percent caustic soda solution and 25 parts of sodium carbonate in 100 parts of water at 0–5° C. After stirring for half an hour 30 percent caustic soda solution in a quantity corresponding to one-tenth of the original volume is added and the solution is heated for one hour to 100° C. Thereafter the solution is rendered weakly acid by means of hydrochloric acid, the precipitation is completed by adding sodium chloride and then filtered. The hydroxy-amino-monoazo dyestuff thus obtained is dissolved in water under adding caustic soda solution. To this solution are added 7 parts of sodium nitrite and the solution is slowly run into diluted hydrochloric acid at 5–10° C., while stirring well. After the diazotization is completed the mixture is added to a solution of 23.6 parts of 1,4-naphthydroquinone methylene sulfone ether, 12 parts of caustic soda solution, 30 parts of sodium carbonate and 200 parts of water. The disazo dyestuff obtained is separated by adding sodium chloride and filtered off. It corresponds to the following formula:

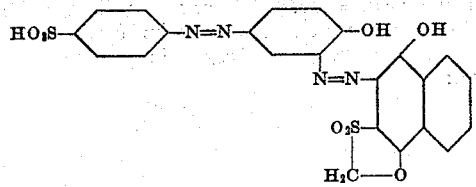

When dried it represents a red-brown powder which dyes wool and polyamide fibres from an acid bath red shades. By an after-treatment of the dyeings with chromium yielding agents olive dyeings of good fastness properties are obtained.

Example 15

15.1 parts of anthranilic acid methyl ester are dissolved in 200 parts of cold water and 30 parts of hydrochloric acid (d.=1.15) and diazotized by adding an aqueous solution of 6.9 parts of sodium nitrite. The diazo compound obtained is added to a solution of 18.6 parts of hydroquinone methylene sulfone ether, 12 parts of caustic soda solution and 30 parts of sodium carbonate in 100 parts of water. After the coupling is completed 40 parts of caustic soda solution are added and the solution is heated for one hour to 80° C. After cooling the thus formed azo dyestuff which corresponds to the following formula:

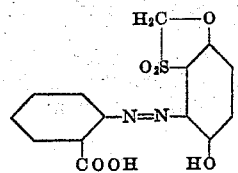

is precipitated by adding sodium chloride and filtered off. After drying it represents a brown powder which dyes wool and polyamide fibres by the monochrome process fast currant shades.

Example 16

28.1 parts of aminohydroquinone methylene sulfone ether sulfonic acid (4-amino-5-hydroxy-benzoxathiol-S-dioxide-7-sulfonic acid) are dissolved in 100 parts of water and 12 parts of caustic soda solution. 6.9 parts of sodium nitrite are given to the solution which is then run into a mixture of 30 parts of hydrochloric acid (d.=1.15) and 30 parts of water at 5° C. The diazo solution obtained is run into a solution of 14.4 parts of 2-hydroxynaphthalene, 12 parts of caustic soda solution and 30 parts of sodium carbonate. After stirring for one hour the formed coupling product is precipitated by adding sodium chloride and filtered off. The dyestuff obtained corresponds to the following formula:

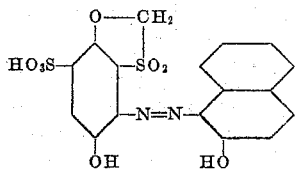

After drying it represents a blue-black powder which dyes wool and polyamide fibres from an acid bath red shades. By an after-treatment with chromium yielding agents, greenish blue shades of improved fastness properties are obtained.

The diazo component used in this example can be obtained e. g. by reducing the monoazo dyestuff from diazotized 1-aminobenzene-3-sulfonic acid and hydroquinone methylene sulfone ether by means of sodium bisulfite in acid medium at 95° C.

*Example 17*

28.1 parts of aminohydroquinone methylene sulfonic ether sulfonic acid are diazotized as described in Example 9 and added to a solution of 23.6 parts of naphthydroquinone methylene sulfone ether, 12 parts of caustic soda solution (d.=1.355), 30 parts of sodium carbonate and 150 parts of water. After stirring for half an hour the formed azo dyestuff corresponding to the following formula:

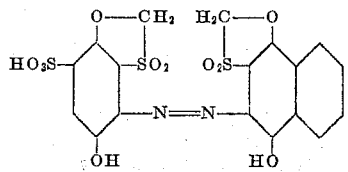

is separated by adding sodium chloride, filtered and dried. It represents a black-violet powder which dyes animal fibres and polyamide fibres from an acid bath red shades. By an after-treatment with chromium yielding agents, greenish blue dyeings are obtained showing improved fastness properties.

*Example 18*

19.9 parts of 1-amino-2-hydroxy-3,5-dinitrobenzene are dissolved with 12 parts of caustic soda solution in 400 parts of hot water. 7.5 parts of sodium nitrite are added to the solution which is then slowly given to 35 parts of hydrochloric acid (d.=1.15) and 100 parts of water with stirring. The temperature is kept at 20° C. by adding ice. When the diazotization is completed the solution is added to a solution of 23.6 parts of naphthydroquinone methylene sulfone ether, 12 parts of caustic soda solution and 30 parts of sodium carbonate in 200 parts of water. After stirring for one hour the temperature is raised to 50° C. and the azo dyestuff which corresponds to the following formula:

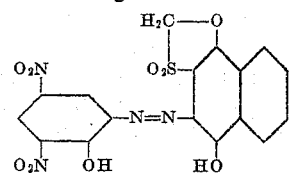

is filtered off after adding sodium chloride. The azo dyestuff thus obtained represents, after drying, a black-brown powder which dissolves in water with a blue-red color; it dyes wool by the monochrome process olive-green shades of good fastness properties.

*Example 19*

18.8 parts of 2-hydroxy-1-aminobenzene-5-sulfonamide are stirred with 30 parts of hydrochloric acid (d.=1.15) and 150 parts of water. A solution of 6.9 parts of sodium nitrite in 20 parts of water is run in at a temperature of 0-5° C. The diazo solution thus formed is added to a solution of 23.6 parts of naphthydroquinone methylene sulfone ether, 12 parts of caustic soda solution, 30 parts of sodium carbonate in 100 parts of water. After one hour the temperature is raised to 40° C. After further 3 hours the azo dyestuff corresponding to the following formula:

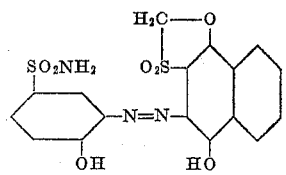

is precipitated by adding sodium chloride and filtered. 43.5 parts of the dyestuff thus prepared are together with 300 parts of water and 12 parts of caustic soda solution heated to 100° C. Thereto within one hour the solution of an ammonia-cobalt (III)-complex prepared in the following way is added: 15 parts of cobalt sulfate are dissolved in 300 parts of water. After adding 70 parts of a 30 percent aqueous ammonia solution it is oxidized to cobalt (III) by passing air through the solution. If metal-free dyestuff can no longer be detected, the dyestuff-cobalt-complex thus formed is separated by adding sodium chloride and filtered. After drying it represents a violet-black powder which dissolves in water with a blue-violet color; it dyes animal fibres and polyamide fibres from a neutral to weakly acid bath violet shades of good fastness properties.

If one or both hydrogen atoms of the sulfonamide group of the diazo component are replaced by methyl, dyestuffs are obtained the cobalt-complex compounds of which dye wool in somewhat bluer violet shades.

The chromium complex compounds obtained from the above metal-free dyestuffs by means of the sodium salt of chromium-salicylic acid according to Example 3 or by another chroming process dye wool reddish blue to blue shades according as the dyestuffs contain a sulfonamide group or a monomethyl or dimethyl sulfonamide group.

By the exchange of the sulfonamide group for the methyl substituted sulfonamide group the good fastness to light of the dyeings is further improved.

*Example 20*

20.4 parts of potassium 4,4'-diaminodiphenyl-3,3'-bis-oxacetate are dissolved in 100 parts of water, to which 6.9 parts of sodium nitrite are added. The solution is dropped into 30 parts of hydrochloric acid (d.=1.15) in 100 parts of water at 0-50° C. The tetrazo compound thus formed is added to a solution of 23.6 parts of naphthydroquinone methylene sulfone ether, 12 parts of caustic soda solution (d.=1.355), 30 parts of sodium carbonate, 80 parts of pyridine in 100 parts of water. After one hour the temperature is raised to 40° C., and after further 2 hours the formed dyestuff corresponding to the following formula:

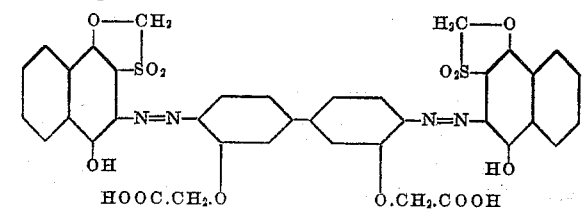

is filtered off. When dried it represents a black-blue powder which dissolves in water with a blue color; it dyes cotton and regenerated cellulose reddish blue shades. By an after-treatment with copper yielding agents in a weakly acid bath the shade turns towards greenish blue. The fastness properties of the dyeings are considerably improved by this after-treatment.

We claim:

1. Dyestuffs selected from the group consisting of azo dyestuffs corresponding to the general formula

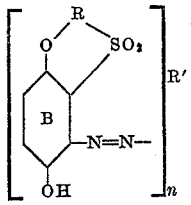

wherein R stands for a radical selected from the group consisting of ring forming lower alkylene and o-arylene radicals, R' stands for an aromatic radical bearing in o-position to the —N=N— bridge a heavy metal complex forming group, B stands for a carbocyclic nucleus selected from the group consisting of benzene and naphthalene nuclei, and $n$ stands for the integers 1 and 2, and the heavy metal complexes of said azo dyestuffs.

2. Dyestuffs selected from the group consisting of azo dyestuffs corresponding to the general formula

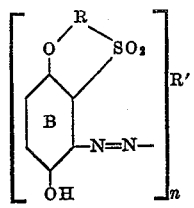

wherein R stands for methylene, R' stands for an aromatic radical bearing in o-position to the —N=N— bridge a heavy metal complex forming group, B stands for a carbocyclic nucleus selected from the group consisting of benzene and naphthalene nuclei, and $n$ stands for the integers 1 and 2, and the heavy metal complexes of said azo dyestuffs.

3. Dyestuffs selected from the group consisting of azo dyestuffs corresponding to the general formula

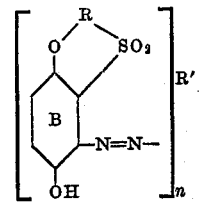

wherein R stands for o-phenylene, R' stands for an aromatic radical bearing in o-position to the —N=N— bridge a heavy metal complex forming group, B stands for a carbocyclic nucleus selected from the group consisting of benzene and naphthalene nuclei, and $n$ stands for the integers 1 and 2, and the heavy metal complexes of said azo dyestuffs.

4. Dyestuffs selected from the group consisting of an azo dyestuff corresponding to the formula

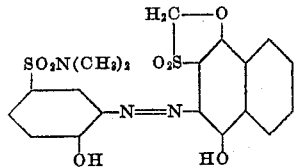

and the chromium complex of said azo dyestuff.

5. Dyestuff selected from the group consisting of an azo dyestuff corresponding to the formula

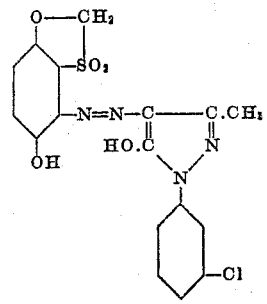

and the chromium complex of said azo dyestuff.

6. Dyestuff selected from the group consisting of an azo dyestuff corresponding to the formula

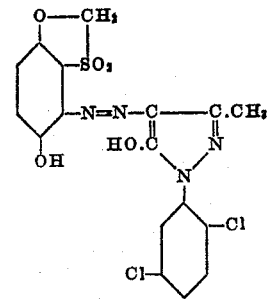

and the cobalt complex of said azo dyestuff.

7. Dyestuff selected from the group consisting of an azo dyestuff corresponding to the formula

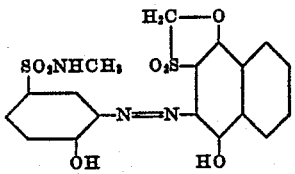

and the cobalt complex of said azo dyestuff.

No references cited.